United States Patent [19]
Yamamoto

[11] Patent Number: 5,351,304
[45] Date of Patent: Sep. 27, 1994

[54] FINGERPRINT DATA REGISTRATION METHOD

[75] Inventor: Makoto Yamamoto, Tokyo, Japan

[73] Assignee: Yozan, Inc., Tokyo, Japan

[21] Appl. No.: 171,966

[22] Filed: Dec. 22, 1993

Related U.S. Application Data

[63] Continuation of Ser. No. 877,199, May 1, 1992, abandoned.

[30] Foreign Application Priority Data

May 7, 1991 [JP] Japan ................................. 3-131887

[51] Int. Cl.$^5$ .............................................. G06K 9/00
[52] U.S. Cl. .......................................... 382/5; 382/14
[58] Field of Search ................... 382/4, 5, 14

[56] References Cited

U.S. PATENT DOCUMENTS

| | | | |
|---|---|---|---|
| 4,003,024 | 1/1977 | Riganati et al. | 382/4 |
| 5,105,467 | 4/1992 | Kim et al. | 382/4 |
| 5,109,428 | 4/1992 | Igaki et al. | 382/4 |

FOREIGN PATENT DOCUMENTS

| | | |
|---|---|---|
| 61-100 | 1/1986 | Japan . |
| 61-101 | 1/1986 | Japan . |
| 61-28171 | 2/1986 | Japan . |
| 61-145686 | 7/1986 | Japan . |
| 62-266686 | 11/1987 | Japan . |
| 9206450 | 4/1992 | PCT Int'l Appl. . |

OTHER PUBLICATIONS

V. K. Singh et al. Feature Recognition and Classification in Fingerprint Patterns, Proc. of the 1977 Int. Conf. on Crime Countermeasures Science and Engineering, pp. 241-248.

Matsuura et al., "A Method for Fingerprint . . . Ridge Direction", The Transactions of the Institute of Electronics, Information and Communication Engineers, D-II, vol. J72-D-II, No. 2, pp. 302-306, Feb. 1989.

Sasakawa et al., "Personal Verification System . . . Fingerprints", The Transactions of the Institute of Electronics, Information and Communication Engineers, D-II, vol. J72-D-II, No. 5, pp. 707-714, May, 1989.

Asai et al., "Automated Fingerprint . . . Procoeosses-", The Transactions of the Institute of Electronics, Information and Communication Engineers, D-II, vol. J72-D-II, No. 5, pp. 724-740, May, 1989.

"Algorithm of Fingerprint Verification System", Nikkei Electronics, Jan. 9, 1989 (No. 464).

*Primary Examiner*—Leo H. Boudreau
*Attorney, Agent, or Firm*—Cushman, Darby & Cushman

[57] ABSTRACT

A fingerprint data registering method which can clearly show the characteristics of minutiae by storing the information of an original image. The method includes thinning a fingerprint image into an array of pixels, converting a pixel in each array into a multi-bit binary value corresponding to the pattern of the array, and storing the multi-bit binary value as the pixel.

4 Claims, 3 Drawing Sheets

FIG. 2
| 3 | 2 | 1 |
|---|---|---|
| 4 | ✕ | 0 |
| 5 | 6 | 7 |
FIG. 3
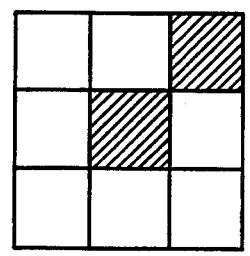
FIG. 4
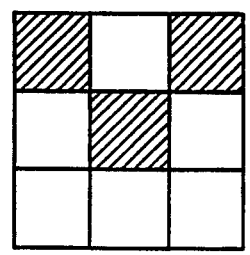
FIG. 5
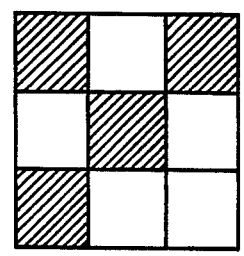

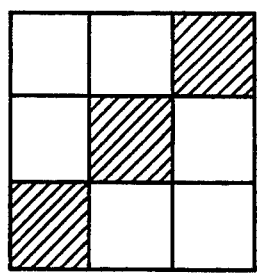
FIG. 6
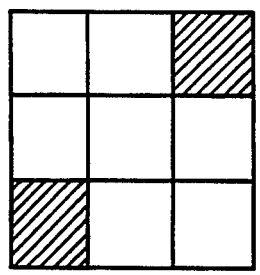
FIG. 7
FIG. 8
FIG. 9
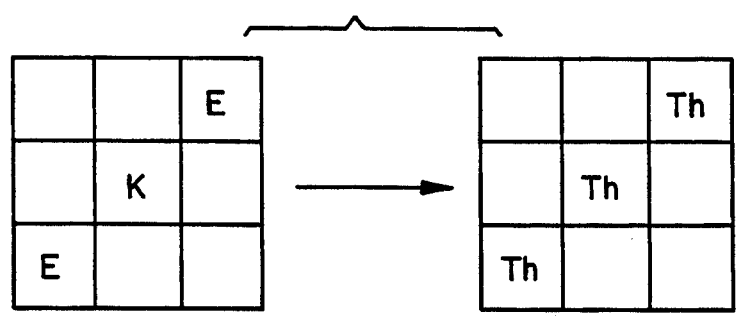

FINGERPRINT DATA REGISTRATION METHOD

This is a continuation of application Ser. No. 07/877,199, filed on May 1, 1992, which was abandoned upon the filing thereof.

FIELD OF THE INVENTION

The present invention relates to a fingerprint data registering method for verifying a fingerprint.

BACKGROUND OF THE INVENTION

For verifying a fingerprint, a minutiae network method which adopts an end point and a branch point as characteristics values is a trustworthy method well supported by results over the years. But it is difficult to prevent noise when a fingerprint image is input, and it is necessary to store not only the data of minutiae but also the whole image data. The information of the original image data is largely lost by the conventional fingerprint verification because only minutiae is extracted. Therefore, It has been necessary to store the whole original image.

SUMMARY OF THE INVENTION

The present invention is invented so as to solve the above problems of the prior art and has an object to provide a data registering method which clearly shows characteristics of minutiae, storing the information of an original data in maximum.

A data registering method according to the present invention performs thinning on a fingerprint image and, for each pixel in the thinned image determines the minutia date, and registers the data of numerical value as the pixel value of the processed pixel.

It is possible to show clearly the characteristics of minutiae, storing the minutia data and arrangement of the pixels adjacent to each pixel in a by thinned image by the fingerprint data registering method according to the present invention.

BRIEF DESCRIPTION OF THE DRAWINGS

FIG. 2 shows a concept for defining the pixels adjacent to any pixel.

FIG. 3 shows an example of an end point pattern.

FIG. 4 shows an example of a V shaped pixel arrangement.

FIG. 5 shows an example of a Y shaped pixel arrangement.

FIG. 6 shows an example of a passing through pattern.

FIG. 7 shows an example of a pixel arrangement containing faintness or scratchiness.

FIG. 8 shows the data structure of registered data.

FIG. 9 shows the processing for correcting a registered data.

PREFERRED EMBODIMENT OF THE PRESENT INVENTION

Figure 1:
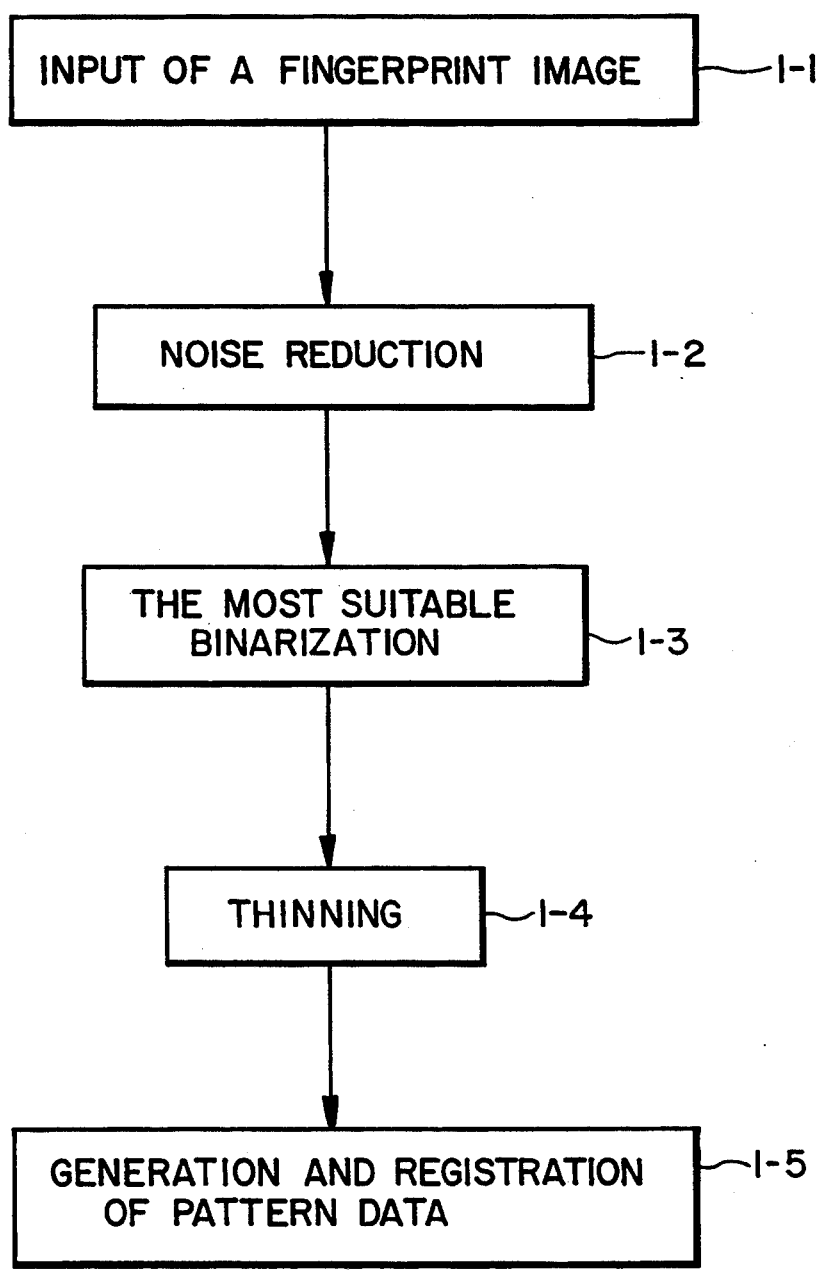
FIG. 1 shows a flowchart of an embodiment of a fingerprint data registering method according to the present invention.

Hereinafter, an embodiment of the fingerprint data registering method according to the present invention is described with reference to the attached drawings.

FIG. 1 shows a flowchart of the serial processing from the input of a fingerprint image to the registration of data. A fingerprint image is input on step 1—1, noise is reduced on step 1-2, binarization is performed the most suitably on step 1-3, and thinning is performed on step 1-4, sequentially. Last, data generation and registration is performed using a look up table. The look up table converts the arrangement of the array formed by the pixels surrounding each pixel in the thinned image into the minutia data of those pixels. The data of each pixel after the conversion is registered in an image memory.

Here, the different fingerprint image arrangements after thinning is performed are shown below.

| MINUTIA CLASSIFICATION | NUMBER OF ARRANGEMENTS WITH THIS CLASSIFICATION | PIXEL ARRANGEMENTS FOR THIS CLASSIFICATION |
| --- | --- | --- |
| End Point | 8 | 0, 1, 2, 3, 4, 5, 6, 7 |
| V shaped Arrangement | 24 | 0-1, 0-2, 0-3, 0-5, 0-6, 0-7, 1-2, 1-3, 1-4, 1-6, 1-7, 2-3, 2-4, 2-5, 2-7, 3-4, 3-5, 3-6, 4-5, 4-6, 4-7, 5-6, 5-7, 6-7 |
| Y shaped Arrangement | 15 | 0-2-4, 0-2-5, 0-2-6, 0-3-5, 0-3-6, 0-4-6, 1-3-5, 1-3-6, 1-3-7, 1-4-6, 1-4-7, 1-5-7, 2-4-6, 2-4-7, 3-5-7 |
| Passing Through | 4 | 0, 1, 2, 3 |

For each pixel in the thinned image, there is an arrangement formed by the peripheral pixels neighboring that pixel (shown by "0" to "7" in FIG. 2). The above table indicates the elements of each arrangement using the pixel numbers shown in FIG. 2. For example, the end point arrangement of direction "1" is shown in FIG. 3. In the same way, the "N" shaped pixel arrangement of direction "1-3" is shown in FIG. 4, the "Y" shaped pixel arrangement of direction "1-3-5" is shown in FIG. 5, and the passing through pattern of direction 1 (which does not show minutiae) is shown in FIG. 6.

FIG. 6 is generated by eliminating one pixel on a line of the arrangement in FIG. 5 because of faintness or scratchiness. Such arrangement is usually called a pseudo-characteristic point, which should be excluded from characteristics points. Pixels 1 and 5 are usually regarded to be end points in the arrangement.

The data to show if the center pixel is a configuration pixel or not ("ON/OFF data", hereinafter) and if it is a peripheral pixel or not are defined so as to identify a datum with the patterns above. The data stored for each pixel is stored as the combination of the data showing the kind of characteristics point ("minutiae data", hereinafter) and the data showing the shape of the pattern arrangement (i.e., the pattern).

The combination of such data can be expressed by 8 bits data below.

Minutia Data

This information shows whether the arrangement is of an end point, a V shaped arrangement V, a Y shaped arrangement Y, or a passing through. In this classification, it is not the problem if the center pixel is a configuration pixel or not. Therefore, the patterns in FIG. 6 and FIG. 7 are the ones of passing through.

It is clear if a pixel is a characteristic point or not and which characteristic point it belongs to by examining upper 2 bits using these definitions.

Pixel Arrangement Data

This information show the pattern of peripheral pixels of the characteristic point defined by the upper 2 bits. There are 24 kinds of pixel arrangements showing "V", whose number of the kinds of pattern is the most. All of 24 kinds of pattern can be defined by 5 bits data.

Storing these data, a arrangement of pixels in a thinned image can be reproduced completely.

Center Pixel Data

If the center pixel is a configuration pixel or not is indicated by LSB. Thus, the upper 7 bits do not indicate whether the center pixel is a configuration pixel or not. Therefore in the upper 7 bits, the passing through arrangement of FIG. 6 and the faint or scratchy arrangement of FIG. 7 are completely the same. Concerning the image including a lot of minute faintness or scratchiness, the same effect of noise reduction can be obtained by examining the upper 7 bits.

FIG. 8 shows the above structure of data conceptually.

Registering such data, it is possible not only to extract characteristics and reduce noise extremely easily but also to reproduce completely the image performed thinning.

With respect to the pseudo-characteristic point above, the data given to a pixel can be corrected according to the condition of peripheral pixels so as to process in the way of the present invention.

In the pattern in FIG. 3, for example, the center pixel is recognized to be an end point. The data of an end point should be corrected when the end point is found to be a pseudo-characteristic point due to the faintness or scratchiness in FIG. 7. FIG. 9 shows the correction. When faintness or scratchiness (shown by "K") exist between end points (shown by "E"), the end point, faintness and scratchiness is changed to be "passing through" (shown by "Th").

What is claimed is:

1. A fingerprint data registering method comprising the steps of:

thinning a fingerprint image;

for each pixel in said thinned image, determining:

(1) a value representing the minutia data for the pattern formed by both said pixel and the pixels which are adjacent to said pixel; and (2) a value representing the specific pixel arrangement of said adjacent pixels; and storing said minutia data value and said pixel arrangement value.

2. A fingerprint data registering method as claimed in claim 1, wherein said minutia data value and said pixel arrangement value are stored as a multi-bit binary value which includes 7 bits of data.

3. A fingerprint data registering method as claimed in claim 2, wherein said multi-bit binary value includes 8 bits of data.

4. A fingerprint data registering method as claimed in claim 1, wherein for each pixel in said thinned image a value indicating whether or not said pixel is a configuration pixel is also stored.

* * * * *